United States Patent [19]
Allen et al.

[11] Patent Number: 5,737,491
[45] Date of Patent: Apr. 7, 1998

[54] ELECTRONIC IMAGING SYSTEM CAPABLE OF IMAGE CAPTURE, LOCAL WIRELESS TRANSMISSION AND VOICE RECOGNITION

[75] Inventors: James D. Allen; Omid A. Moghadam; Donna M. Romer, all of Rochester, N.Y.

[73] Assignee: Eastman Kodak Company, Rochester, N.Y.

[21] Appl. No.: 672,773

[22] Filed: Jun. 28, 1996

[51] Int. Cl.$^6$ ........................................ G10L 3/00
[52] U.S. Cl. .................. 395/2.79; 395/2.81; 395/2.84; 396/283; 348/211
[58] Field of Search ........................ 395/2.79, 2.81, 395/2.84; 396/283, 287; 348/211, 223

[56] References Cited

U.S. PATENT DOCUMENTS

| | | | |
|---|---|---|---|
| 4,502,771 | 3/1985 | Katsuma et al. | 354/289 |
| 4,726,065 | 2/1988 | Froessl | 381/41 |
| 4,757,541 | 7/1988 | Beadles | 381/43 |
| 4,856,066 | 8/1989 | Lemelson | 381/36 |
| 4,870,686 | 9/1989 | Gerson et al. | 381/43 |
| 5,027,149 | 6/1991 | Hoshino et al. | 354/412 |
| 5,179,446 | 1/1993 | Hong | 358/224 |
| 5,633,678 | 5/1997 | Parulski et al. | 348/232 |

OTHER PUBLICATIONS

Pepper, Jon "Instant Images for Your omputer." FamilyPC, World Wide Web, http://www1.zdnet.com/familypc/comtent/960617/fthw/index.html, 1996.

*Primary Examiner*—Allen R. MacDonald
*Assistant Examiner*—Alphonso A. Collins
*Attorney, Agent, or Firm*—Thomas H. Close

[57] ABSTRACT

A system for digital image capture and transmission, includes a digital camera that has an electronic image sensor for sensing an image and producing a digital image; a memory for storing digital images produced by the image sensor in digital image files, the digital image files having associated information for controlling a remote image fulfillment server; a voice recorder for digitizing voice commands relating to control of the image fulfillment server; and a transmitter for transmitting the digital image file to the image fulfillment server. Either the camera or the fulfillment server includes a voice recognition module responsive to the digitized voice commands for producing control signals for the image fulfillment server. The image fulfillment server includes a receiver for receiving the digital image file and control signals; a memory for storing the received digital image file; and a file manager for managing the digital image file in response to the control signals.

7 Claims, 3 Drawing Sheets

ELECTRONIC IMAGING SYSTEM CAPABLE OF IMAGE CAPTURE, LOCAL WIRELESS TRANSMISSION AND VOICE RECOGNITION

FIELD OF THE INVENTION

The present invention relates in general to the field of electronic photography, and in particular to an electronic image capture and transmission system capable of wireless transmission and voice recognition.

BACKGROUND OF THE INVENTION

In the field of professional photography especially in the field of photo journalism and sports photography, speedy delivery of photographs of an event to the photo editor is an important factor. In many instances today, the film is shipped directly to the news photo editor via courier. Another method is to use a digital camera such as the Kodak DCS 420 or Kodak DC50 which are capable of capturing images by using a CCD sensor and storing them in a digital file. The digital images are stored in solid state memory, a hard drive on the camera or a removable solid state memory card such as a PCMCIA memory card. These files can then be downloaded to a portable computer and transmitted to a remote computer via a telecommunication connection such as a modem. Although this solution offers the photojournalist and his editor a faster turnaround time than the traditional route of a courier delivering film and prints, it still means that he must leave the scene to find a phone.

SUMMARY OF THE INVENTION

The present invention is directed to overcoming one or more of the problems set forth above. Briefly summarized, according to one aspect of the present invention, a system for digital image capture and transmission, includes a digital camera that has an electronic image sensor for sensing an image and producing a digital image; a memory for storing digital images produced by the image sensor in digital image files, the digital image files having associated information for controlling a remote image fulfillment server; a voice recorder for digitizing voice commands relating to control of the image fulfillment server; and a transceiver for transmitting the digital image file to the image fulfillment server. Either the camera or the fulfillment server includes a voice recognition module responsive to the digitized voice commands for producing control signals for the image fulfillment server. The image fulfillment server includes a transceiver for receiving the digital image file and control signals; a memory for storing the received digital image file; and a file manager for managing the digital image file in response to the control signals.

ADVANTAGEOUS EFFECT OF THE INVENTION

The system of the present invention has the advantage of providing for easy control over fast delivery of digital images in the field that allows a choice of different communication relay services. For example a sports photographer can transmit his digital images locally via wireless transmission to a local image fulfillment server at the stadium with instructions to make prints and transmit images via an ISDN connection to his magazine's photo editor or to a remote image fulfillment server computer.

Using the present invention, an amateur photographer can capture an electronic image at a special event or scenic vacation spot. The image may be transmitted via a wireless connection such as a cellular phone service to a fulfillment server where the images are printed according to the photographers voice instructions and the printed images are forwarded to a desired address. The digital images may also be stored for future access by the photographer, or further transmitted to designated e-mail addresses.

These and other aspects, objects, features and advantages of the present invention will be more clearly understood and appreciated from a review of the following detailed description of the preferred embodiments and appended claims, and by reference to the accompanying drawings.

BRIEF DESCRIPTION OF THE DRAWINGS

To facilitate understanding, identical reference numerals have been used, where possible, to designate identical sections that are common to the figures.

DETAILED DESCRIPTION OF THE INVENTION

Figure 1:
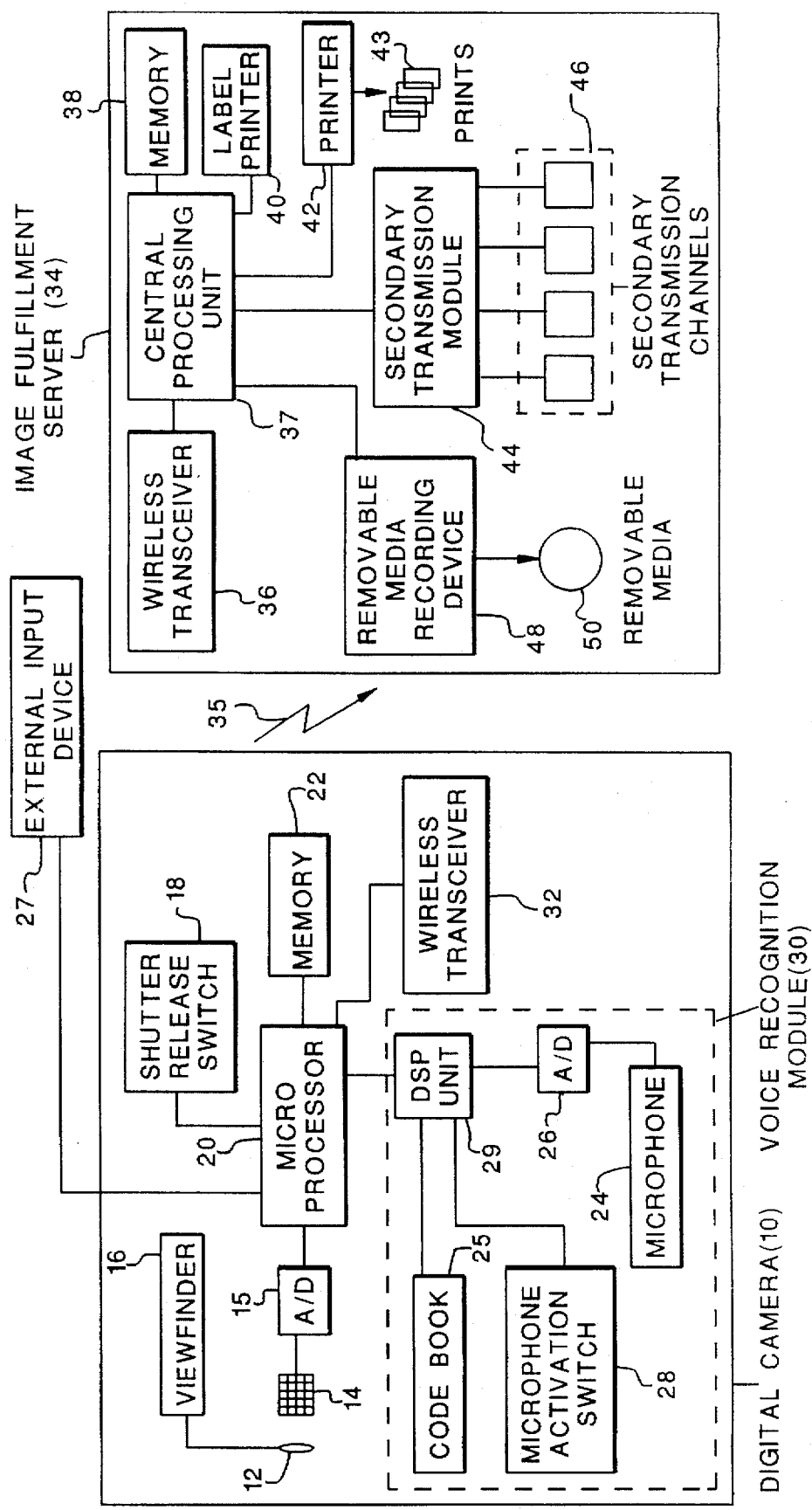
FIG. 1 is a schematic diagram illustrating a digital wireless photography and image transmission system with speech recognition capabilities according to the present invention.

Referring to FIG. 1, a digital camera generally designated 10, includes a lens 12, an image sensor 14 located behind the lens 12, a viewfinder 16, a shutter release 18, a microprocessor 20 for controlling the camera, a temporary memory 22 for storing digital images produced by the image sensor 14 and digitized sound signals and spoken commands sensed by a microphone 24. The microphone 24, an analog to digital converter 26 for digitizing the sounds sensed by the microphone 24, and a sound recording microphone activation switch 28 for activating the sound recording function of the camera, are all included in a voice recognition module 30.

The voice recognition module 30 recognizes voice commands and produces control signals for use by an image fulfillment server 34 as described below. The digital camera 10 also includes a transceiver 32 for transmitting the digital images, and control signals to the image fulfillment server 34.

The voice recognition module 30 includes a code book 25 provided by the camera manufacturer and customized by the photographer and a digital signal processing unit (DSP) 29 for comparing the photographer's digitized voice commands to digital voice templates stored in code book 25 and generating control signals to be appended to the digital image file. The DSP 29 may comprise, for example, a TMS3477 digital signal processing chip, manufactured by Texas Instruments Inc., Dallas, Tex., or an RSC-164 digital signal processing chip manufactured by Sensory Circuits Inc., San Jose, Calif.

The camera 10 includes an interface, such as a SCSI port, for connecting to an external input device 27 such as a keyboard or LCD touch screen. The external input device 27 may be used to enter information such as text annotation, electronic addresses or file names that are to be associated with photographer's utterances. An example of this would be an e-mail address such as "moghadam@kodak.com" which is associated with a spoken command such as "address 1", or "grandma".

The transceiver 32 is a wireless communication system such as a cellular telephone or a digital wireless communication system such as the personal handy phone system (HPS). The microprocessor 20 is programmed to attach a unique identification code (e.g. a camera serial number) to each digital image produced by the camera.

The image fulfillment server 34 receives transmissions from the digital camera 10, for example by a wireless transceiver 36 or by connection to a telecommunications network that includes a wireless transceiver. The image fulfillment server 34 includes a central processor 37; and a memory 38 for receiving and storing digital images and control signals that are transmitted from the camera 10. The central processor 37 executes the control signals that are received with the digital images. The image fulfillment server includes a data file relating each identification code (e.g. camera serial number) with information relating to its owner, such as the owners phone number, credit card number, name, address, or e-mail address. The central processing unit 37 is programmed to read identification code associated with the digital images that are received and to retrieve the owner information to charge the owner for services provided. For example, the services provided may be charged to the owners phone number, credit card number, or a bill sent to the owners address.

A printer 42 for producing prints 43 from the digital images and annotated text is connected to the image fulfillment server 34. The printer may be a thermal printer such as the XLS8600 manufactured by the Eastman Kodak Company, Rochester, N.Y., or a digital silver halide printer. A secondary transmission module 44 is connected to the image fulfillment server for transmitting the digital images over any one or more of a plurality of secondary communication channels 46 in response to control signals received with the digital images. The secondary communication channels may be, for example, connections to the Internet, satellite communication systems, ISDN, or conventional telephone lines. A label printer 40 is provided for printing instructions to the operator of the image fulfillment server, such as: mailing instructions for prints; identification of the owners of the prints; and billing notices for services provided by the image fulfillment server. A removable media writer 50, such as a CD-R recorder or a floppy disc writer is connected to the central processing unit 37 for recording the digital images on digital recording medium for returning to the customer, or forwarding to a designated location.

In operation, a photographer captures the image of a scene with the digital camera 10, and verbally instructs the camera to perform one or more of the command functions listed in Table 1.

| VERBAL COMMAND | FUNCTION |
| --- | --- |
| "Erase" | -Erase the image from the camera memory |
| "Send to (address)(channel)" | -Transmit the image to the image fulfillment server with appended command to forward image over one of the secondary communication channels to a designated address |
| "Name (file name)" | -Appended a file name to image from a list of file names recorded by the photographer |
| "Text (message)" | -Annotate the digital image with a text message from a list of text messages recorded by the photographer |

-continued

| VERBAL COMMAND | FUNCTION |
| --- | --- |
| "Print (number)" | -Make a designated number of prints of the digital image of a particular size at the image fulfillment server |
| "Write (media type)" | -Write digital images to removable media |
| "Send Prints (address)" | -Send the prints to a designated address pre recorded by the photographer |
| "Bill (account)" | -Charge the services to a designated account |
| "Transmit" | -Transmit image with appended control signals to the image fulfillment server |

The verbal instructions are digitized and compared to the previously digitized voice commands stored in the code book 25. When a match is made between the digitized spoken command and the digitized command stored in the code book, the command is "recognized" by the DSP unit 29 in the voice recognition module 30 to produce a control signal for the camera 10 or the image fulfillment server 34. Control signals for the image fulfillment server 34 are appended to the digital image in an image file header. At the verbal command of the photographer, the digital images and appended control signals are transmitted to the image fulfillment server 34 by transceiver 32. At the image fulfillment server, the transceiver 36 receives the digital images and the control signals and stores them temporarily in memory 38. The central processor 37 responds to the control signals to effect requested services related to the digital image.

Alternatively, the digital signal processor 29 and code book 25 of the voice recognition module 30 may be located at the image fulfillment server 34 rather than in the camera. In this case, the camera includes a manual user interface for effecting the camera operations and for appending the digitized sound annotations to the image and transmitting the annotated image to the image fulfillment server 34.

Figure 2:
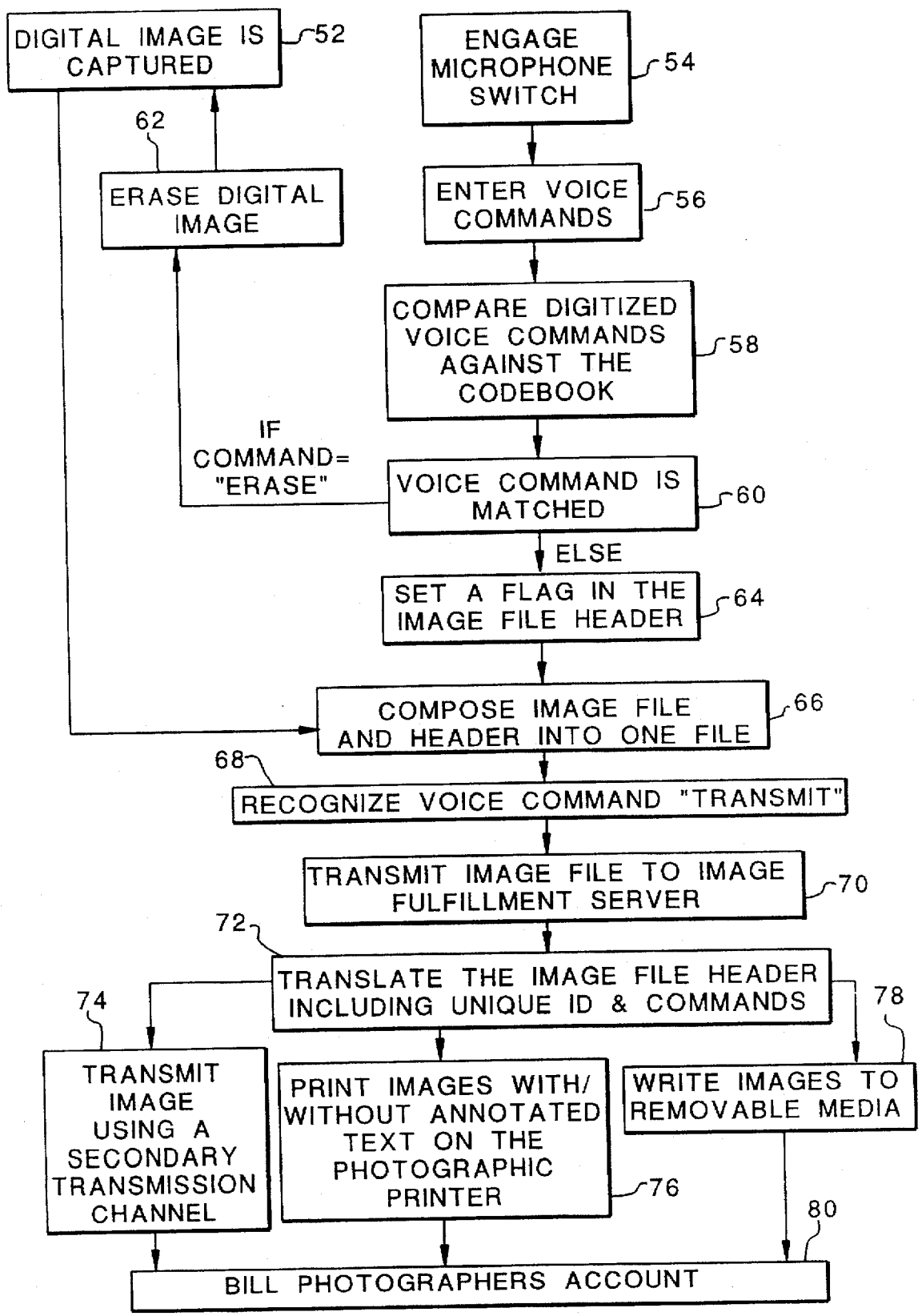
FIG. 2 is a flow chart illustrating the method of image capture, storage and transmission according to an embodiment of the present invention, with the speech recognition subsystem in the camera.

The operation of the system with the voice recognition capability in the camera 10 will now be described with reference to FIG. 2. The photographer actuates the camera 10 to capture a digital image 52. Next, the photographer engages the microphone switch 54 and enters a voice command 56. The camera 10 digitizes the voice command and compares 58 the digitized voice command with the commands stored in the codebook. When the digitized voice command is matched 60 to a command in the codebook, the voice command is "recognized". If the command is "erase", the digital image stored in the camera is erased 62. Commands that include associated voice data, such as the "text" command are recognized and a command flag corresponding to the command is set in the image file header and digitized voice data following the command is added to the image file header 64. The image file header is then appended to the digital image 66. When the voice command "transmit" is recognized 68, the camera 10 transmits 70 the digital image file to the image fulfillment center 34.

At the fulfillment center 34, the central processing unit 37 reads the image file header 72, which includes the I.D. of the camera, command flags and the digital voice data; and effects the action indicated by the command flags that are set. For example, if the "send to" flag is set, the image data is transmitted 74 via secondary transmission channel 46 through transmission module 44 to the electronic address recorded in the digitized voice data. If the "text" flag is set, the recognized voice data and associated information is converted to ASCII code and the ASCII code is stored in the header of the digital image.

If the "print" flag is set, the digital image is printed on the printer 42, making the number of prints indicated by the digitized voice data in the image header 76. Finally, the central processing unit 37 bills the photographers account 80 for the services rendered.

Figure 3:
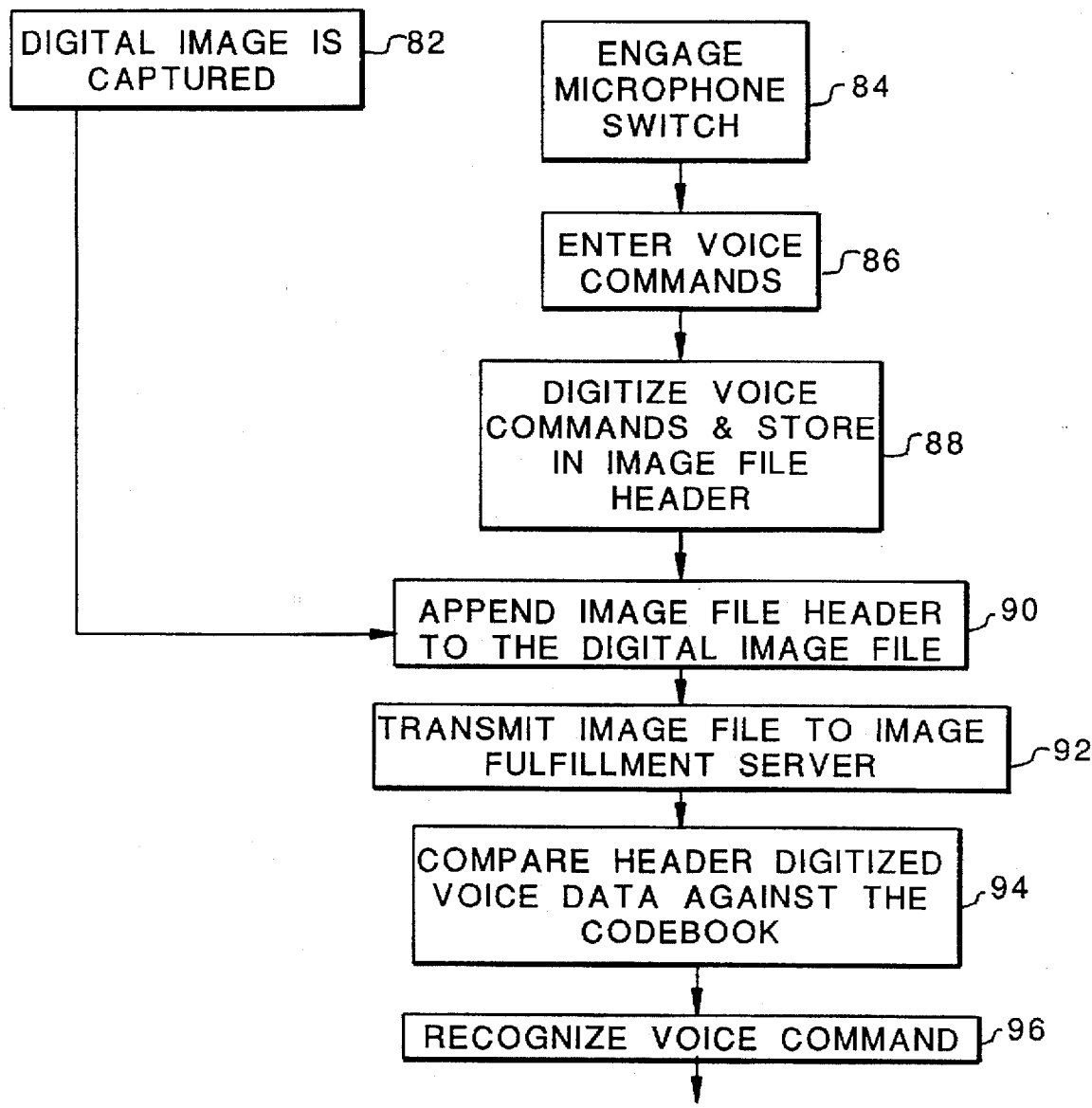
FIG. 3 is a flow chart illustrating the method of image capture, storage and transmission according to an embodiment of the present invention with the speech recognition subsystem in the image fulfillment server.

Turning now to FIG. 3, the operation of the system with the voice recognition capability in the image fulfillment server will be described. First, the photographer captures an image 82. Next, the photographer engages the microphone switch 84 and enters a voice command 86. The camera 10 digitizes the voice command and stores the digitized voice command in a file header 88. The file header is appended to the digital image 90. When the microphone switch is released, the camera 10 transmits the image file to the image fulfillment server 34.

At the image fulfillment server, the digitized voice data stored in the file header is recognized by comparing to the text code book 94, and when a match is made 96, the commands are executed as described above.

The invention has been described with reference to a preferred embodiment. However, it will be appreciated that variations and modifications can be effected by a person of ordinary skill in the art without departing from the scope of the invention.

PARTS LIST

| | |
|---|---|
| 10 | camera |
| 12 | lens |
| 14 | image sensor |
| 15 | A/D converter |
| 16 | view finder |
| 18 | shutter release |
| 20 | micro processor |
| 22 | temporary memory |
| 24 | microphone |
| 25 | codebook |
| 26 | A/D converter |
| 27 | external input device |
| 28 | microphone activation switch |
| 29 | digital signal processing(DSP) unit |
| 30 | voice recognition module |
| 32 | transceiver(camera) |
| 34 | image fulfillment server |
| 35 | wireless transmission link |
| 36 | transceiver(image fulfillment server) |
| 37 | central processing unit(CPU) |
| 38 | memory |
| 40 | label printer |
| 42 | printer |
| 43 | prints |
| 44 | transmission module |
| 46 | secondary communication channels |
| 48 | removable media recording device |
| 50 | removable media |
| 52 | digital image capture step |
| 54 | engage microphone step |
| 56 | enter voice command step |
| 58 | compare voice command step |
| 60 | match voice command step |
| 62 | erase digital-image step |
| 64 | set flag step |
| 66 | compose image file and header step |
| 68 | recognize "transmit" step |
| 70 | transmit step |
| 72 | translate image file header step |
| 74 | transmit image step |
| 76 | print step |
| 78 | write image to removable media step |
| 80 | bill photographer's account step |
| 82 | capture digital image step |
| 84 | engage microphone step |
| 86 | enter voice command step |
| 88 | digitize voice commands and store in file header step |
| 90 | append image file header to digital image step |

-continued
PARTS LIST

| | |
|---|---|
| 92 | transmit image file to fulfillment server step |
| 94 | compare header data step |
| 96 | recognize voice commands step |

We claim:

1. A system for digital image capture and transmission, comprising:

a) a digital camera having:
   i) an electronic image sensor for sensing an image and producing a digital image;
   ii) a memory for storing digital images produced by the image sensor in digital image files, the digital image files having associated information for controlling a remote image fulfillment server;
   iii) a voice recorder for digitizing voice commands relating to control of the image fulfillment server; and
   iv) a transmitter for transmitting the digital image file to the image fulfillment server;

b) a voice recognition module responsive to the digitized voice commands for producing control signals for the image fulfillment server; and c) an image fulfillment server, having:
   i) a receiver for receiving the digital image file and control signals;
   ii) a memory for storing the received digital image file; and
   iii) a file manager for managing the digital image file in response to the control signals.

2. The system for digital image capture and transmission claimed in claim 1, wherein the voice recognition module is located in the camera and the control signals are transmitted with the digital image file to the image fulfillment server.

3. The system for digital image capture and transmission claimed in claim 1, wherein the voice recognition module is located in the image fulfillment server and the digitized voice commands are transmitted to the image fulfillment server.

4. The system for digital image capture and transmission claimed in claim 1, wherein the image fulfillment server includes a telecommunications processor having a connection to a plurality of secondary communications channels and the file manager manages the digital image file by storing the digital image file in the memory or causing the digital image file to be transmitted over one or more of the communications channels according to the associated information.

5. The system for digital image capture and transmission claimed in claim 1, wherein the image fulfillment server includes a printer for printing the digital image and an annotation on the print, and the control signals include instructions for printing.

6. The system for digital image capture and transmission claimed in claim 1, wherein the control signals include an image file name.

7. The system for digital image capture and transmission claimed in claim 5, wherein the control signals include an address for sending the print.

* * * * *